UNITED STATES PATENT OFFICE.

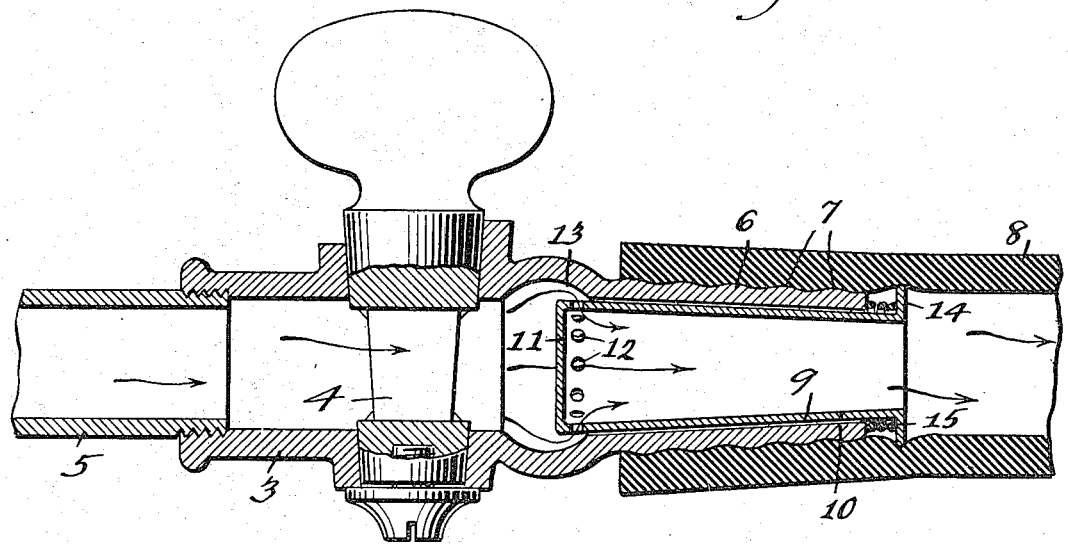

GEORGE W. CAMPBELL, JR., OF PHILADELPHIA, PENNSYLVANIA.

GAS-COCK.

1,141,768.  Specification of Letters Patent.  Patented June 1, 1915.

Application filed March 3, 1915. Serial No. 11,673.

*To all whom it may concern:*

Be it known that I, GEORGE W. CAMPBELL, Jr., a citizen of the United States, and a resident of Philadelphia, in the county of Philadelphia and State of Pennsylvania, have invented certain new and useful Improvements in Gas-Cocks, of which the following is a specification.

My invention relates to gas-cocks of that class used in connection with flexible conduits, as for lamps, stoves, and the like, and one of the main objects thereof is to provide means in connection with such devices whereby the gas will be automatically shut off in the event of the disconnection, accidentally or otherwise, of the conduit from the cock.

A further object is to provide such means which automatically open communication between the cock and conduit when the latter is connected to the former; and further objects are to provide such devices which are simple in construction, positive in operation, composed of but few parts not likely to get out of order to require repair, and comparatively inexpensive.

My invention is fully described in the following specification, of which the accompanying drawings form a part, in which like reference characters refer to like parts in each of the views, and in which:—

Figure 1 is a longitudinal, central, section taken through a gas-cock constructed in accordance with a present preferred form of embodiment of my invention, in normally operative position; and Fig. 2 is a similar view thereof with the gas-hose detached, and showing the method of closing off the gas supply automatically.

In the drawings forming a part of this application I have shown one form of embodiment of my invention, comprising a casing 3 provided with a manually operable valve 4 of any desired form, said casing being threaded onto a gas-pipe 5 of the gas system, as in a dwelling or the like.

The casing 3 is provided with a tubular member 6, preferably outwardly tapered and provided with ridges 7 or the equivalent adapted for engagement with a gas-hose 8 of any type and in the usual manner. The conventional gas hose is lined with a flexible and resilient material if not itself entirely formed of such material, and this permits diametrical expansion when forced over the tubular member 6.

The bore 9 of the member 6 is of conical form as shown, although this is not essential, to provide a seat for a similarly formed slide-valve 10 closed at its inner end, as shown at 11, though provided with a plurality of ports 12 on the periphery thereof adjacent said closed end; the interior of the member 6 is abruptly enlarged, as shown at 13, from the inner end of the tapered bore 9, whereby when the slide-valve 10 is in its outermost position, the ports 12 will be within the bore 9 and covered by the wall of said bore to prevent the entry of gas into said slide-valve, this position of said slide-valve being illustrated in Fig. 2. The outer end of said slide-valve is open and provided with an outwardly directed flange 14 serving as a seat for a coil-spring 15 the other end of which bears against the outer end of the tubular member 6, and the tendency of this spring is to move the slide-valve into its outermost position and maintain the same in this position, thereby preventing the passage of gas to or through the slide-valve.

The flange 14 is of a diameter slightly exceeding the internal diameter of the gas-hose 8 whereby a positive engagement is insured of said flange with said hose in the operation of forcing the latter upon the tubular member 6; this flange engagement by the hose, in forcing the latter upon the tubular member 6, forces the slide-valve inwardly of the casing 3 and carrying the ports 12 clear of the bore 9 and into the position of the enlargement of the casing interior at 13, and the gas is free to pass to and through the slide-valve and to and through the gas-hose when the rotary valve 4 is opened. However, if the hose 8 should be accidentally disconnected from the tubular member 6, the coil-spring 15 will at once seat the slide-valve 10 and no gas may then escape from the gas-cock, and any possibility of asphyxiation of occupants of a room in which this cock is located is obviated.

While I have described the device as adapted for use in connection with a gas supply, it will be apparent that it may also be used for water or for other purposes; further, while I have shown and described a specific structure, it will be obvious that many changes thereover may be made, within the scope of the following claim, without departing from the spirit of the invention, or sacrificing its advantages.

Having fully described my invention, what I claim as new, and desire to secure by Letters Patent, is:—

The combination with a gas-cock having a tubular member thereon and a gas-hose on said member; of a tapered slide-valve in said member closed at its inner end and provided with lateral perforations adjacent thereto, said tubular member being provided with a tapered bore serving as a seat for said valve when the latter is in its outermost position and serving to close said perforations, the outer end of said valve being open and provided with a flange of slightly greater diameter than that of the interior of the hose, whereby said hose will maintain said valve in innermost position, and a spring interposed between the outer end of said tubular member and said flange and tending to seat said valve when said hose is removed from said tubular member.

In testimony whereof I have signed my name to this specification in the presence of two subscribing witnesses.

GEORGE W. CAMPBELL, JR.

Witnesses:
FREDK. A. HAINES,
GEORGE W. CAMPBELL, Sr.